(12) United States Patent
Warkentin et al.

(10) Patent No.: US 11,042,485 B2
(45) Date of Patent: Jun. 22, 2021

(54) IMPLEMENTING FIRMWARE RUNTIME SERVICES IN A COMPUTER SYSTEM

(71) Applicant: VMware, Inc., Palo Alto, CA (US)

(72) Inventors: Andrei Warkentin, North Andover, MA (US); Cyprien Laplace, Cambridge, MA (US); Alexander Fainkichen, Southborough, MA (US); Ye Li, Newton Highlands, MA (US); Regis Duchesne, Monts-de-Corsier (CH)

(73) Assignee: VMware, Inc., Palo Alto, CA (US)

( * ) Notice: Subject to any disclaimer, the term of this patent is extended or adjusted under 35 U.S.C. 154(b) by 145 days.

(21) Appl. No.: 16/013,263

(22) Filed: Jun. 20, 2018

(65) Prior Publication Data
US 2019/0391814 A1 Dec. 26, 2019

(51) Int. Cl.
*G06F 12/10* (2016.01)
*G06F 9/455* (2018.01)

(52) U.S. Cl.
CPC .......... *G06F 12/10* (2013.01); *G06F 9/45558* (2013.01); *G06F 2009/45583* (2013.01); *G06F 2212/1008* (2013.01); *G06F 2212/657* (2013.01)

(58) Field of Classification Search
CPC .... G06F 9/4401; G06F 9/45533; G06F 13/26; G06F 9/3865; G06F 9/4812; G06F 9/545; G06F 9/45558; G06F 12/10; G06F 2009/45583; G06F 2212/1008; G06F 2212/657
See application file for complete search history.

(56) References Cited

U.S. PATENT DOCUMENTS

| 9,465,617 | B1* | 10/2016 | Warkentin | G06F 9/30145 |
| 2009/0144046 | A1* | 6/2009 | Rothman | G06F 9/45516 |
| | | | | 703/27 |
| 2013/0151831 | A1* | 6/2013 | Bealkowski | G06F 9/4401 |
| | | | | 713/2 |

* cited by examiner

*Primary Examiner* — Dong U Kim
(74) *Attorney, Agent, or Firm* — Patterson + Sheridan, LLP

(57) ABSTRACT

An example method of implementing firmware runtime services in a computer system having a processor with a plurality of hierarchical privilege levels, the method including: calling, from software executing at a first privilege level of the processor, a runtime service stub in a firmware of the computer system; executing, by the runtime service stub, an upcall instruction from the first privilege level to a second privilege level of the processor that is more privileged than the first privilege level; and executing, by a handler, a runtime service at the second privilege level in response to execution of the upcall instruction.

18 Claims, 4 Drawing Sheets

IMPLEMENTING FIRMWARE RUNTIME SERVICES IN A COMPUTER SYSTEM

BACKGROUND

Computer system firmware, such as that complying with the Unified Extensible Firmware Interface (UEFI) specifications, provides runtime services to provide platform support. For example, system firmware can include runtime services for accessing a real-time clock, accessing non-volatile random access memory (NVRAM) variables, providing firmware update features, controlling power state transitions (e.g., reboot, power off, suspend, etc.), and the like. Runtime services are executed in a special environment in the same privilege level as the operating system (OS). Depending on the OS, runtime services are either executed with 1:1 physical memory mappings of boot memory regions or execute in the OS's own virtual address space. The later configuration relies on the OS to call a special runtime service (e.g., SetVirtualAddressMap in UEFI firmware) to switch from physical to virtual memory mappings. Failing to correctly implement the special runtime service (e.g., SetVirtualAddressMap) and the functionality of the runtime services using virtual addresses requires that an OS resort to physical addressing for the runtime services, deploy various work-arounds, or avoid using the runtime services entirely.

SUMMARY

One or more embodiments provide a method of implementing firmware runtime services in a computer system having a processor with a plurality of hierarchical privilege levels, the method including: calling, from software executing at a first privilege level of the processor, a runtime service stub in a firmware of the computer system; executing, by the runtime service stub, an upcall instruction from the first privilege level to a second privilege level of the processor that is more privileged than the first privilege level; and executing, by a handler, a runtime service at the second privilege level in response to execution of the upcall instruction.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for implementing firmware runtime services in a computer system having a processor with a plurality of hierarchical privilege levels are described. In an embodiment, software executing a first privilege level calls a runtime service stub in a firmware of the computer system. In embodiments, the software can be a host operating system (OS) executing directly on the hardware platform of the computer system, or a guest OS executing in a virtual machine (VM) managed by a hypervisor executing on the hardware platform. As used herein, "firmware" encompasses system firmware of the computer system (which is typically stored in non-volatile memory of the computer system) or virtual firmware presented to a VM by a hypervisor. The runtime service stub executes an upcall instruction from the first privilege level to a second privilege level of the processor that is more privilege than the first privilege level. In embodiments, the first privilege level is a supervisor privilege level and the second privilege level is a hypervisor privilege level or a secure firmware privilege level. In response to execution of the upcall instruction, a handler executes a runtime service at the second privilege level. In embodiments, the handler is part of secure firmware of the computer system or is part of a hypervisor executing on the computer system.

In this manner, the handling of firmware runtime services is moved to a higher privilege level of the processor than at which the calling software executes. For bare-metal firmware implementations, the runtime services can be part of secure firmware in the computer system. For virtual firmware implementations, the runtime services can be part of the hypervisor executing on the computer system. The runtime service support of the firmware (e.g., system firmware of the computer system or virtual firmware presented by a hypervisor) is reduced to stub implementation. The runtime service stubs execute upcall instructions to generate exceptions that are handled at the higher privilege level in order to execute the actual runtime services. The firmware needs only a minimum set of code/data necessary to thunk to the higher-privileged handler, which implements the actual runtime services. These and further aspects are described below with respect to the drawings.

Figure 1:
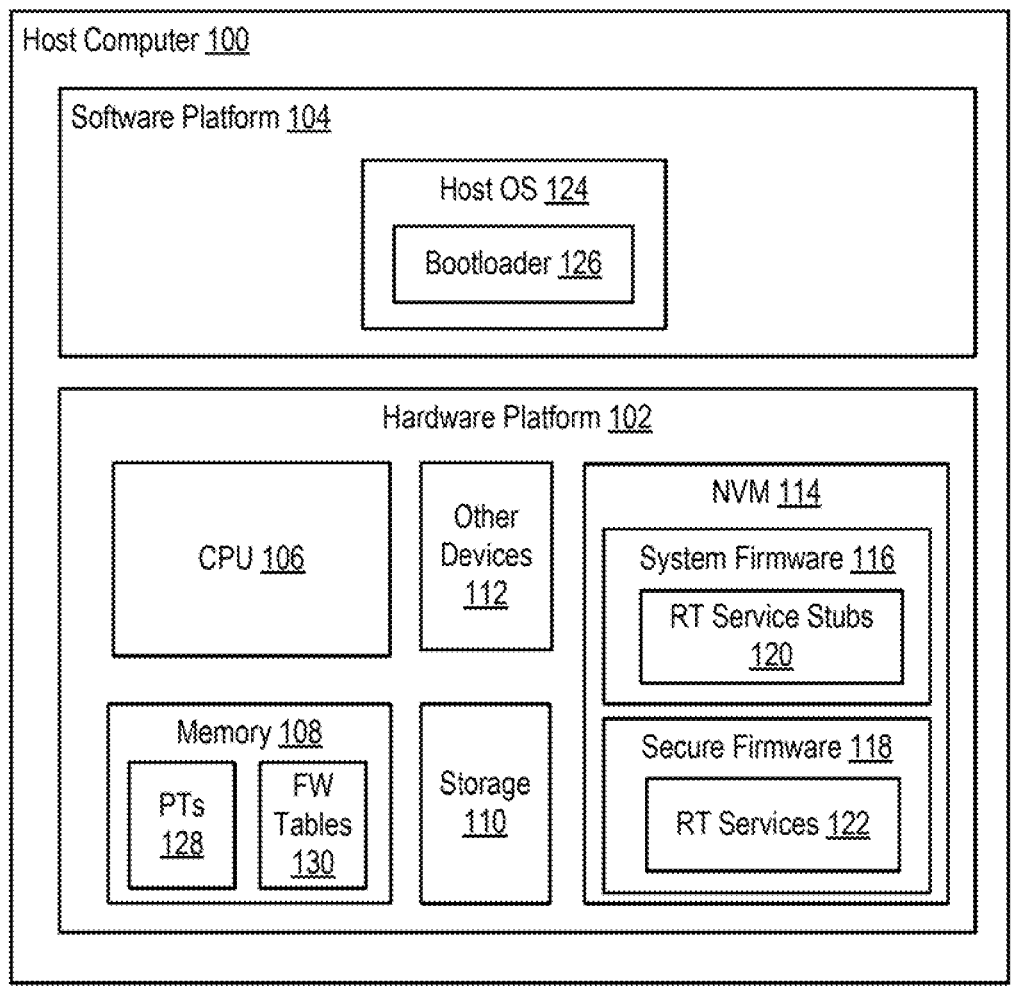
FIG. 1 is a block diagram depicting a computing system according to an embodiment.

FIG. 1 is a block diagram depicting a computer system (host computer 100) according to an embodiment. Host computer 100 includes a software platform 104 executing on a hardware platform 102. Hardware platform 102 may include conventional components of a computing device, such as a central processing unit (CPU) 106 and system memory 108, as well as a storage system (storage 110), other devices 112 (e.g., input/output devices and the like), and non-volatile memory (NVM) 114. CPU 106 is configured to execute instructions, for example, executable instructions that perform one or more operations described herein and may be stored in system memory 108 and storage 110. System memory 108 is a device allowing information, such as executable instructions, virtual disks, configurations, and other data, to be stored and retrieved. System memory 108 may include, for example, one or more random access memory (RAM) modules.

Figure 2:
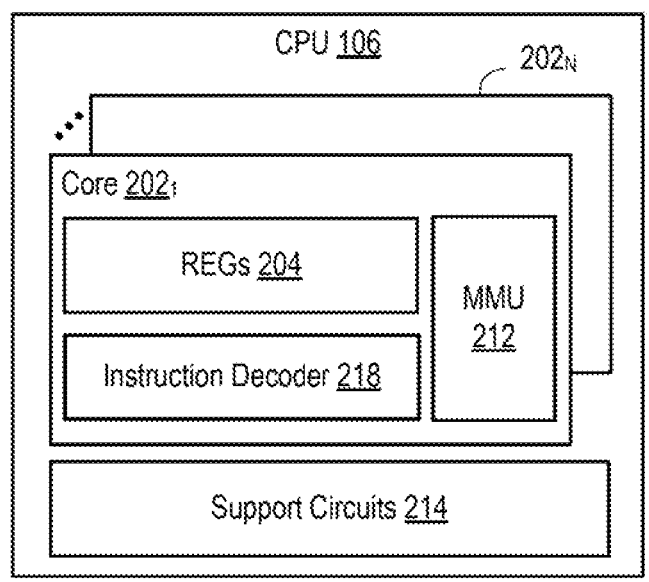
FIG. 2 is a block diagram depicting a central processing unit (CPU) according to an embodiment.

FIG. 2 is a block diagram depicting CPU 106 according to an embodiment. CPU 106 includes one or more cores 202 (e.g., cores $202_1 \ldots 202_N$, where N is an integer greater than zero) and support circuits 214. Each core 202 is a microprocessor or like type processor element. Each core 202 includes, among other components, registers 204, a memory management unit (MMU) 212, and an instruction decoder 218. Other components of core 202 (e.g., an arithmetic logic unit (ALU), floating point unit (FPU), program registers, cache memory, etc.) are omitted for clarity. Support circuits 214 include circuitry shared by cores $202_1 \ldots 202_N$, such as cache memory, direct memory access (DMA) circuits, interrupt controller circuits, an input/output MMU (IOMMU), and the like.

Code is executed on a core 202 at a particular privilege level (PL) of a hierarchy of privilege levels. In an embodiment, each core 202 is a processing element ("processor") compliant with the ARM®v8 architecture or the like that includes four PLs known as exception levels (ELs), which are defined as EL0, EL1, EL2, and EL3 in order of increasing code-execution privilege. Execution at EL0 is referred to as "unprivileged execution" and execution at any of EL1, EL2, and EL3 is referred to as "privileged execution." EL0 is an example of a "user PL;" EL1 is an example of a "supervisor PL;" EL2 is an example of a "hypervisor PL;" and EL3 is an example of a "secure PL." In general, each core 202 supports a hierarchy of privilege levels having distinguishable code execution privileges, such as a user PL, a supervisor PL, a hypervisor PL, and a secure PL. Various examples described herein refer to a processor (e.g., a core 202) having the ARM®v8 hardware architecture and executing in the 64-bit execution state (referred to as AArch64). It is to be understood that the techniques described herein can be employed by executing programs on processors having similar hardware architectures consistent with the functional description herein.

Registers 204 include system registers for use by code to configure and control core 202. System registers are associated with different privilege levels. System registers 204 include PL0 registers, PL1 registers, PL2 registers, and PL3 registers. PL0 registers are accessible by code executing at any privilege level. PL1 registers are accessible by code executing at PL1 or above. PL2 registers are accessible by code executing at PL2 or above. PL3 registers are accessible by code executing at PL3.

Instruction decoder 218 supports an instruction set of core 202. Instruction decoder 218 decodes input instructions and controls functional units of core 202 to perform the input instructions. The instruction set of core 202 can include branch instructions, exception generating instructions, system instructions, data processing instructions, load and store instructions, and the like. In an embodiment, the instruction set of core 202 includes one or more instructions for generating exceptions to a higher privilege level. For example, the A64 instruction set of an ARM®v8-compliant processor include: an SMC instruction, executable at PL1 or PL2, for causing an exception to PL3; and HVC instruction, executable at PL1, for causing an exception to PL2. Other processors can include similar types of instructions.

MMU 212 implements memory management in the form of paging of memory 108. MMU 212 controls address translation and access permissions for memory accesses made by core 202. MMU 212 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 212 generates an exception. MMU 212 is controlled by one or more of registers 204. MMU 212 can include one or more translation lookaside buffers (TLBs) (not shown) that cache address translations. One type of translation scheme includes a single stage of address translation that receives a virtual address (VA) in a virtual address space and outputs a physical address (PA) in a physical address space. The virtual address space is a flat logical address space managed by software. The physical address space includes the physical memory map that includes memory 108. Another type of translation scheme includes two stages of address translation. The first stage of address translation receives a VA and outputs an intermediate physical address (IPA) in an intermediate physical address space. The second stage of address translation receives an IPA and outputs a PA. The IPA address space is a flat logical address space managed by software.

Each enabled stage of address translation in a translation scheme uses memory mapped tables referred to as page tables 128. If not cached in a TLB, a given address translation requires one or more lookups of page tables 128 (referred to as one or more levels of lookup). A page table walk, which is implemented by the hardware of MMU 212, is the set of lookups required to translate a VA to a PA. Page tables 128 are organized into hierarchies, where each page table hierarchy includes a base table and a plurality of additional tables corresponding to one or more additional levels. For example, the ARM®v8 architecture specifies up to four levels of page tables referred to as level 0 through level 3 tables. The number of levels in a page table hierarchy depends on the page size.

In an embodiment, the instruction set of core 202 includes an address translation instruction. The address translation instruction includes operands for specifying the translation stage, the privilege level, the access type (read or write), and the IA. A core 202 executes the address translation instruction to translate the IA using MMU 212 given the requested translation stage, privilege level, and access type. The result of the address translation is stored in a specific register 204. For example, the A64 ISA defined in the ARM®v8 architecture includes an instruction AT<operation>, <Xt>, where <operation> controls the translation stage, privilege level, and access type, and <Xt> is the IA to be translated. The result of executing the AT instruction is stored in the register PAR_EL1. Executing the address translation instruction is similar to actually reading from or writing to the specified IA. However, if there is a fault, the address translation instruction does not throw an exception. Rather, the fault can be decoded from the result stored in the appropriate register (e.g., PAR_EL1).

Returning to FIG. 1, storage 110 includes local storage devices (e.g., one or more hard disks, flash memory modules, solid state disks, and optical disks) and/or a storage interface that enables computing system 100 to communicate with one or more network data storage systems. Examples of a storage interface are a host bus adapter (HBA) that couples computing system 100 to one or more storage arrays, such as a storage area network (SAN) or a network-attached storage (NAS), as well as other network data storage systems. NVM 114 is a device allowing information to be stored persistently regardless of the state of power applied to host computer 102 (e.g., FLASH memory or the like). NVM 114 stores system firmware 116, which can have a Unified Extensible Firmware Interface (UEFI) or the like. In an embodiment, NVM 114 also stores secure firmware 118, which stores code for implementing runtime (RT) services 122, as discussed further below. RT services 122 can be drivers that provide support for accessing a real time clock (or any other device), accessing information in firmware (FW) tables 130, firmware updating, affecting power state transitions (reboot, power off, etc.), and the like.

Software platform 104 includes a host operating system (OS) 124. Host OS 124 executes directly on hardware platform 102. Host OS 124 can be any commodity operating system known in the art, such as such as Linux®, Microsoft Windows®, Mac OS®, or the like. Host OS 124 includes a bootloader 126. Bootloader 126 comprises program code executable by CPU 106 to initialize hardware platform 102 for use by host OS 124. Bootloader 126 is called by system firmware 116 upon boot up of host computer 102.

Figure 3:
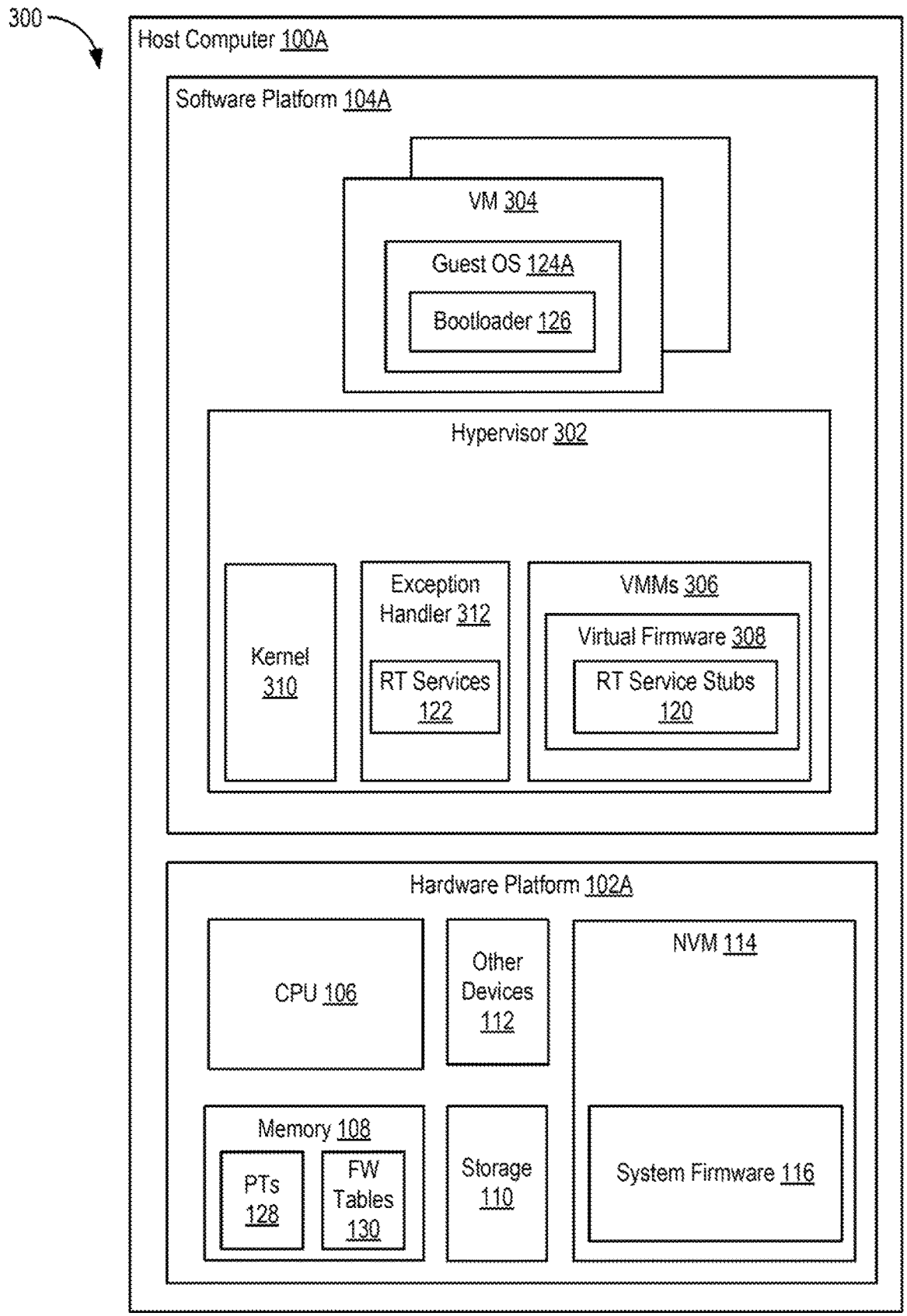
FIG. 3 is a block diagram depicting a virtualized computing system according to an embodiment.

FIG. 3 is a block diagram depicting a virtualized computing system 300 according to an embodiment. Virtualized computing system 300 includes a host computer 100A having a software platform 104A executing on a hardware platform 102A. Hardware platform 102A is substantially similar to hardware platform 102 described above. In embodiments, NVM 114 in hardware platform 102A can omit secure firmware and only include system firmware 116. In other embodiments, NVM 114 in hardware platform 102A can also include secure firmware. The software platform 104A includes a virtualization layer that abstracts processor, memory, storage, and networking resources of hardware platform 102A into one or more virtual machines ("VMs") 304 that run concurrently on host computer 102A. VMs 304 run on top of the virtualization layer, referred to herein as a hypervisor 302, which enables sharing of the hardware resources by VMs 304. One example of hypervisor 302 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein).

Each VM 304 supported by hypervisor 302 includes guest software (also referred to as guest code) that runs on the virtualized resources supported by hardware platform 104A. In the example shown, the guest software of each VM 304 includes a guest OS 124A. Guest OS 124A can be any commodity operating system known in the art, such as such as Linux®, Microsoft Windows®, Mac OS®, or the like.

Hypervisor 302 includes, among other components, a kernel 310, an exception handler 312, and virtual machine monitors (VMMs) 306. Kernel 310 provides operating system functionality (e.g., process creation and control, file system, process threads, etc.), as well as CPU scheduling and memory scheduling. VMMs 306 implement the virtual system support needed to coordinate operations between hypervisor 302 and VMs 304. Each VMM 306 manages a corresponding virtual hardware platform that includes emulated hardware, such as virtual CPUs and guest physical memory. Virtual CPUs are backed by cores 202, and guest physical memory is backed by system memory 108. Each virtual hardware platform supports the installation of guest software in a corresponding VM 304. Each VMM 306 also presents virtual firmware 308 to each VM 304. In embodiments, kernel 310 executes at EL2 or EU; VMMs execute at EL2; guest OS in each VM 304 executes at EU; and applications in each VM 304 execute at EL1 or EL0. Exception handler 312 includes RT services 122, which are discussed further below.

As noted above, UEFI runtime services can be executed in a special environment in the same privilege level as the OS. Depending on the choice of OS, UEFI runtime services are executed with 1:1 physical mappings of boot memory regions marked as "runtime service," or executed in the OS's own virtual address space. The later relies on the OS calling a special runtime service known as SetVirtualAddressMap to switch from physical memory mappings to virtual memory mappings. The OS relies on correct implementations of SetVirtualAddressMap and the various runtime services. UEFI runtime services must register a special callback that will be called as part of SetVirtualAddressMap handling: 1) to convert any heap-allocated pointers (internal to the runtime services) to new addresses; 2) to convert any pointers to non-module local data; and 3) to avoid calling UEFI boot services as part of future runtime call handling. Additionally: 1) all ranges used by runtime services must be described in the memory map; and 2) code should not assume the presence of new mappings across the call to SetVirtualAddressMap. Failing to correctly implement a single runtime service can mean that an OS must use physical addressing for runtime services. It can also mean that the OS must employ various workarounds. Certain kinds of specification violations prevent an OS from using runtime services safely entirely, such as failing to preserve OS CPU state (e.g., interrupt masking flags) across runtime service calls.

Most of runtime service implementation issues stem from two problems. First, involves running runtime service code in the same privilege level as the OS, which can introduce bugs (via runtime services) that fail to preserve OS CPU state across runtime service calls. Second involves running runtime service code in the same address space of the OS, where runtime services can fail to convert all necessary pointers to match the new address space in response to the call to SetVirtualAddressMap. In addition, runtime service code running in the same environment as UEFI code during system power-up, and frequently sharing data and code, can lead to bugs where RT code relies on code or data structures in non-RT memory ranges.

In an embodiment, techniques described herein solve the aforementioned problems with firmware runtime services, such as UEFI runtime services, by moving the handling of RT calls to a higher privilege level. For bare-metal firmware implementations, such as that shown in FIG. 1, the techniques are implemented using secure firmware 118. For virtualized systems, such as that shown in FIG. 3, the techniques are implemented using hypervisor 302.

Notably, as shown in FIG. 1, the system firmware 116 provides RT service stubs 120 to be called by host OS 124 (e.g., by bootloader 126). A "stub" is in general configured to call another method to perform its designated function. Each RT service stub 120 provides an interface of methods that can be invoked by host OS 124. Each method performs an upcall to a higher privilege level than the current privilege level. An "upcall" is an instruction that invokes a higher privilege level from the current privilege level. In the embodiment shown, RT services 122 execute at PL3 in secure firmware 118. Thus, each method of an RT service stub 120 performs an upcall to PL3 (e.g., via a smc call in ARM®v8). The upcall includes an operand that indicates which method has been invoked by the host OS 124. Thus, each RT service stub 120 includes a minimum set of code/data necessary to thunk to secure firmware 118 and to optionally update information (e.g., pointers) in FW tables 130, such as the FirmwareServices vtable pointer or the like. An example implementation of RT service stub methods is shown below:

GetVariable:
    smc #RTCallGate1
    ret
GetNextVariableName:
    smc #RTCallGate2
    ret In the above example, the RT service stub methods GetVariable and GetNextVariableName each include an smc call with an immediate operand that indicates the method called (e.g., #RTCallGate1 and #RTCallGate2). The smc call generates an exception to PL3, which is handled by secure firmware 118. Secure firmware 118 provides the actual implementation of the invoked methods in RT services 122. The transition to the higher privilege level (e.g., PL3) saves the current execution state as part of the exception handling for the mode being called into. RT services 122 in secure firmware 118 then use the operand of the call (e.g., #RTCallGate1) to determine which method to execute. For example, a prototype for the method GetNextVariableName can be:
GetNextVariableName(IN                OUT
UINTN*VariableNameSize,
    IN OUT CHAR16*VariableName,
    IN OUT EFI_GUID*VenderGuid);
The example method takes three pointers provided by host OS 124. The pointers are in the address space of the RT call being made by host OS 124. If host OS 124 used physical addresses, the pointers would be to machine addresses. If host OS 124 has enabled virtual addressing and invoked SetVirtualAddressMap, the pointers are to virtual addresses that must be translated in the context of the OS.

In secure firmware 118, RT services 122 execute in their own physical address space separate from the physical address space accessible by host OS 124. The RT service methods can translate caller addresses into machine addresses using an address translation instruction (e.g., the AT instruction in ARM®v8). The RT service methods can determine which privilege level from which the call was made through the exception information, and can then select the appropriate operands for use the address translation instruction to translate and validate read or write addresses. Once an RT service method has a machine address returned by the address translation instruction, the RT service method can access the memory by mapping it accordingly in the PL3 translation scheme and then reading or writing the data required for handling the call. The RT service methods provide return status through the exception frame structure used for function returns. Once the RT service method finishes, the implementation will return-from-exception back to host OS 124. In this manner, RT services 122 are wholly isolated from system firmware 116 and host OS 124, which avoids the problems associated with completely implementing RT services in system firmware, as discussed above.

Referring to FIG. 3, the techniques for implementing RT services 122 are similar to those of FIG. 1, with the following differences. In this embodiment, the OS is guest OS 124A. VMMs 306 present virtual firmware 308 to guest OS 124A, which makes calls to RT service methods. Virtual firmware 308 implements RT service stubs 120. In this embodiment, RT service stubs 120 implement methods that execute upcalls to hypervisor 302 (e.g., using the hvc instruction in place of the smc instruction). Hypervisor 302 executes at PL2 and includes exception handler 312 for implementing RT services 122. Exception handler 312 handles the exceptions generated by the upcalls of RT service stubs 120 and invokes methods of RT services 122 based on the specified index of the upcall. Otherwise, the techniques operate as described above are used to implement RT services 122 (in this case, executing code at PL2).

Figure 4:
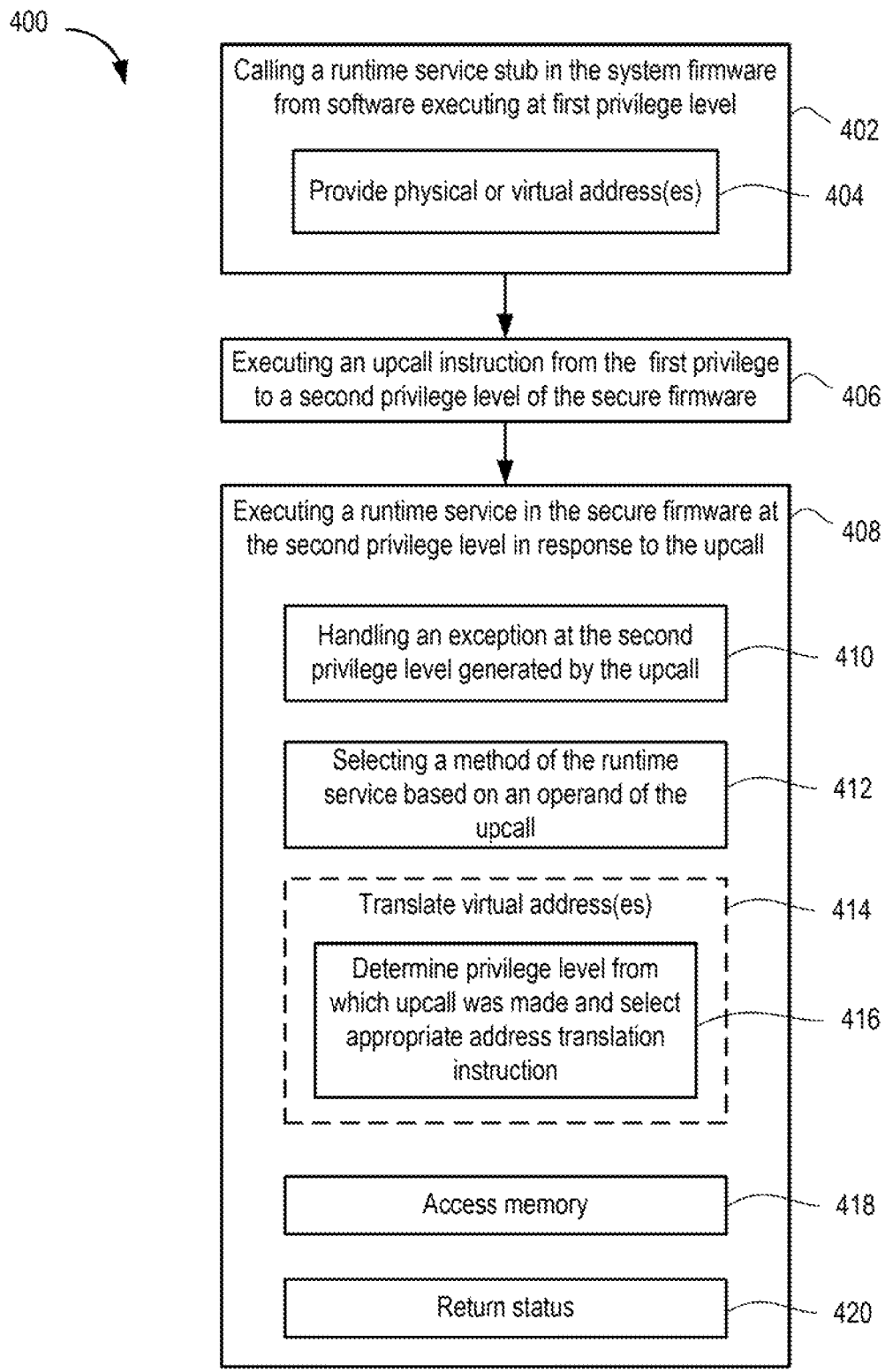
FIG. 4 is a flow diagram depicting a method of implementing firmware runtime services in a computer system according to an embodiment.

FIG. 4 is a flow diagram depicting a method 400 of implementing firmware runtime services in a computer system according to an embodiment. Method 400 can be performed by host computer 100 of FIG. 1. Method 400 begins at step 402, where software executing at a first privilege level calls a runtime service stub 120 in system firmware 116. The software can be host OS 124, and the first privilege level can be PL1 (e.g., supervisor privilege level). In an embodiment, at step 404, the software (e.g., host OS 124) provides either physical or virtual addresses for use by the called runtime service.

At step 406, runtime service stub 120 executes an upcall instruction from the first privilege level to a second privilege level of secure firmware 118 (e.g., an SMC instruction to PL3). The upcall instruction can include an operand specifying the method of the runtime service to invoke. At step 408, secure firmware 118 executes a runtime service 122 at the second privilege level (e.g., PL3) in response to execution of the upcall instruction. In this case, secure firmware 118 is the handler for receiving exceptions generated by the upcall instructions and for executing runtime services 122.

In an embodiment, at step 410, secure firmware 118 handles an exception at the second privilege level (e.g., PL3) generated by execution of the upcall instruction. At step 412, secure firmware 118 selects a method of a runtime service 122 based on an operand of the upcall instruction. At optional step 414, a runtime service 122 translates virtual address(es) in the case where host OS 124 implements a virtual address scheme. For example, at step 416, a runtime service 122 can determine the privilege level from which an upcall instruction was made and select the appropriate operands for the address translation instruction. In this manner, a runtime service 122 obtains physical address(es), which can then be mapped into the PL3 translation scheme and used to access the memory. If host OS 124 uses a physical address scheme, step 414 is omitted. At step 418, a runtime service 122 accesses the memory and performs its function. At step 420, a runtime service 122 returns status to host OS 124 through the exception frame structure.

Figure 5:
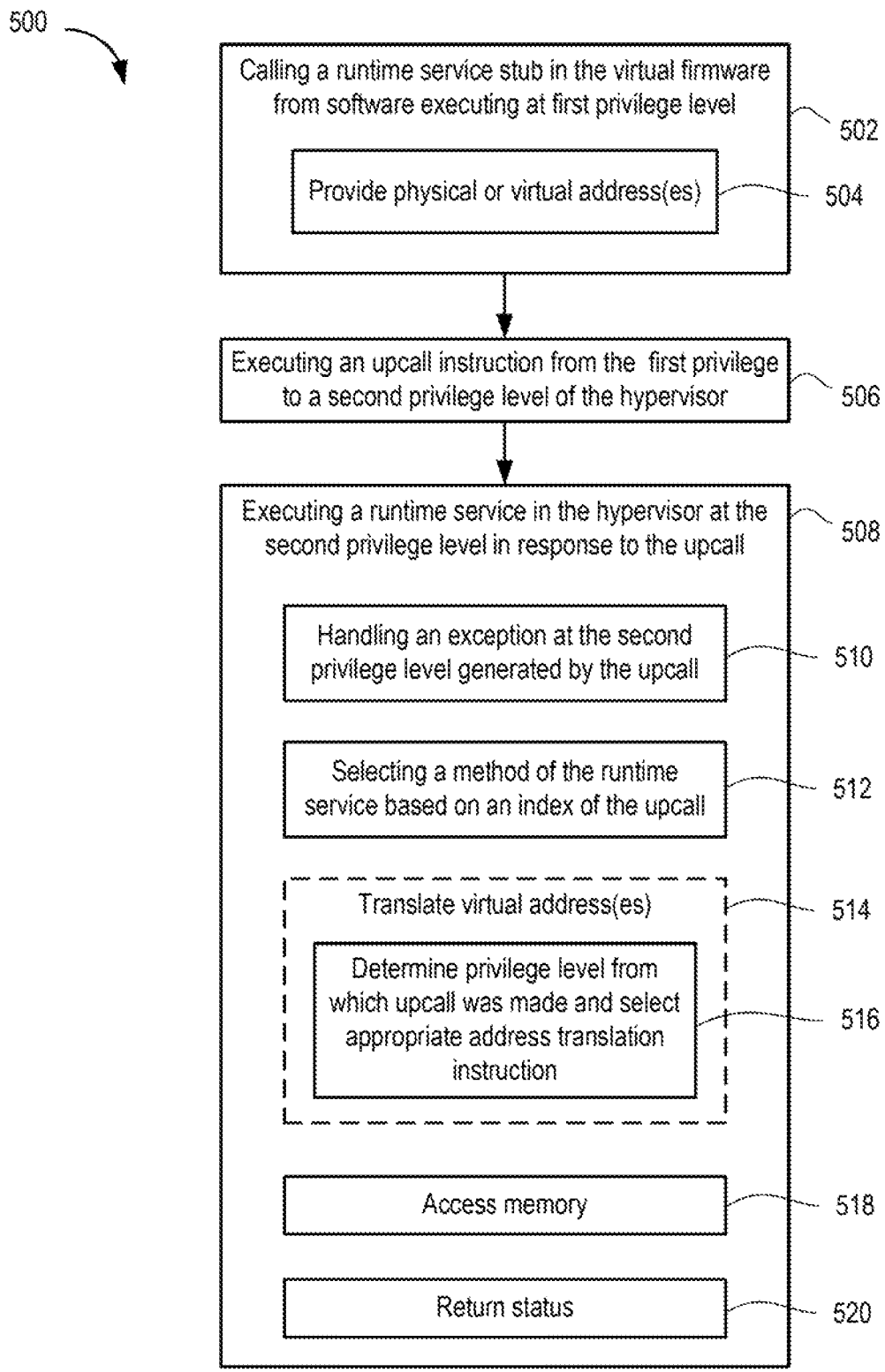
FIG. 5 is a flow diagram depicting a method of implementing firmware runtime services in a computer system according to another embodiment.

FIG. 5 is a flow diagram depicting a method 500 of implementing firmware runtime services in a computer system according to an embodiment. Method 500 can be performed by host computer 100A of FIG. 3. Method 500 begins at step 502, where software executing at a first privilege level calls a runtime service stub 120 in virtual firmware 308. The software can be guest OS 124A, and the first privilege level can be PL1 (e.g., supervisor privilege level). In an embodiment, at step 504, the software (e.g., guest OS 124A) provides either physical or virtual addresses for use by the called runtime service.

At step 506, runtime service stub 120 executes an upcall instruction from the first privilege level to a second privilege level of hypervisor 302 (e.g., an HVC instruction to PL2). The upcall instruction can include an operand specifying the method of the runtime service to invoke. At step 508, exception handler 312 of hypervisor 302 executes a runtime service 122 at the second privilege level (e.g., PL2) in response to execution of the upcall instruction. In this case, exception handler 312 is the handler for receiving exceptions generated by the upcall instructions and for executing runtime services 122.

In an embodiment, at step 510, exception handler 312 handles an exception at the second privilege level (e.g., PL2) generated by execution of the upcall instruction. At step 512, exception handler 312 selects a method of a runtime service 122 based on an operand of the upcall instruction. At optional step 514, a runtime service 122 translates virtual address(es) in the case where guest OS 124A implements a virtual address scheme. For example, at step 516, a runtime service 122 can determine the privilege level from which an upcall instruction was made and select the appropriate operands for the address translation instruction. In this manner, a runtime service 122 obtains physical address(es), which can then be mapped into the PL2 translation scheme and used to access the memory. If guest OS 124A uses a physical address scheme, step 514 is omitted. At step 518, a runtime service 122 accesses the memory and performs its function. At step 520, a runtime service 122 returns status to guest OS 124A through the exception frame structure.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of implementing firmware runtime services in a computer system having a processor with a plurality of hierarchical privilege levels, the method comprising:
    calling, from software executing at a first privilege level of the processor, a runtime service stub in a firmware of the computer system;
    executing, by the runtime service stub in response to the calling, an upcall instruction from the first privilege level to a second privilege level of the processor that is more privileged than the first privilege level; and
    executing, by a handler, a runtime service at the second privilege level in response to execution of the upcall instruction, the executing the runtime service comprising:
        handling an exception at the second privilege level generated by execution of the upcall instruction; and
        selecting a method of the runtime service to execute based on an operand of the upcall instruction and the first privilege level from which the upcall was invoked.

2. The method of claim 1, further comprising:
    returning status to the software from the handler through an exception frame structure.

3. The method of claim 1, wherein the software provides a physical address in a physical address space used by the processor, and wherein the step of executing the runtime service comprises accessing memory in the computer system using the physical address.

4. The method of claim 1, wherein the software provides a virtual address in a virtual address space used by the processor, and wherein the step of executing the runtime service comprises:
    executing an address translation instruction to translate the virtual address into a physical address in a physical address space used by the processor; and
    accessing memory in the computer system through the physical address.

5. The method of claim 4, wherein the step of executing the address translation instruction comprises:
    determining that the upcall instruction was invoked from the first privilege level based on exception information; and
    selecting the operand for the address translation instruction based on the determined first privilege level from which the upcall instruction was invoked.

6. The method of claim 1, wherein the plurality of hierarchical privilege levels include a user privilege level, a supervisor privilege level, a hypervisor privilege level, and a secure privilege level, wherein the first privilege level is the supervisor privilege level and the second privilege level is the secure privilege level, wherein the software comprises a host operating system, and wherein the runtime service is part of secure firmware stored in non-volatile memory of the computer system.

7. The method of claim 1, wherein the plurality of hierarchical privilege levels include a user privilege level, a supervisor privilege level, and a hypervisor privilege level, wherein the first privilege level is the supervisor privilege level and the second privilege level is the hypervisor privilege level, wherein the software comprises a guest operating system, and wherein the runtime service is part of a hypervisor executing in the computer system, the hypervisor managing a virtual machine (VM) in which the guest operating system executes.

8. The method of claim 1, wherein the firmware includes a unified extensible firmware interface (UEFI) having the runtime service stub.

9. A non-transitory computer readable medium having instructions stored thereon that when executed by a processor cause the processor to perform a method of implementing firmware runtime services in a computer system having a processor with a plurality of hierarchical privilege levels, the method comprising:
    calling, from software executing at a first privilege level of the processor, a runtime service stub in a firmware of the computer system;
    executing, by the runtime service stub in response to the calling, an upcall instruction from the first privilege level to a second privilege level of the processor that is more privileged than the first privilege level; and
    executing, by a handler, a runtime service at the second privilege level in response to execution of the upcall instruction, the executing the runtime service comprising:
        handling an exception at the second privilege level generated by execution of the upcall instruction; and
        selecting a method of the runtime service to execute based on an operand of the upcall instruction and the first privilege level from which the upcall was invoked.

10. The non-transitory computer readable medium of claim 9, further comprising:
    returning status to the software from the handler through an exception frame structure.

11. The non-transitory computer readable medium of claim 9, wherein the software provides a physical address in a physical address space used by the processor, and wherein the step of executing the runtime service comprises accessing memory in the computer system using the physical address.

12. The non-transitory computer readable medium of claim 9, wherein the software provides a virtual address in a virtual address space used by the processor, and wherein the step of executing the runtime service comprises:
    executing an address translation instruction to translate the virtual address into a physical address in a physical address space used by the processor; and
    accessing memory in the computer system through the physical address.

13. The non-transitory computer readable medium of claim 12, wherein the step of executing the address translation instruction comprises:
    determining that the upcall instruction was invoked from the first privilege level based on exception information; and
    selecting the operand for the address translation instruction based on the determined first privilege level from which the upcall instruction was invoked.

14. The non-transitory computer readable medium of claim 9, wherein the plurality of hierarchical privilege levels include a user privilege level, a supervisor privilege level, a hypervisor privilege level, and a secure privilege level, wherein the first privilege level is the supervisor privilege level and the second privilege level is the secure privilege level, wherein the software comprises a host operating system, and wherein the runtime service is part of secure firmware stored in non-volatile memory of the computer system.

15. The non-transitory computer readable medium of claim 9, wherein the plurality of hierarchical privilege levels include a user privilege level, a supervisor privilege level, and a hypervisor privilege level, wherein the first privilege level is the supervisor privilege level and the second privilege level is the hypervisor privilege level, wherein the software comprises a guest operating system, and wherein the runtime service is part of a hypervisor executing in the computer system, the hypervisor managing a virtual machine (VM) in which the guest operating system executes.

16. A computer system, comprising:
   a hardware platform including a processor and memory, the processor including a plurality of hierarchical privilege levels; and
   a software platform executing on the hardware platform, the software platform including software executing at a first privilege level of the processor and a handler executing at a second privilege level of the processor that is more privileged than the first privilege level, the software platform configured to:
      call, from the software, a runtime service stub in a firmware;
      execute, by the runtime service stub in response to the call, an upcall instruction from the first privilege level to the second privilege level; and
      execute, by the handler, a runtime service at the second privilege level in response to execution of the upcall instruction, the software platform further configured to:
         handle an exception at the second privilege level generated by execution of the upcall instruction; and
         select a method of the runtime service to execute based on an operand of the upcall instruction and the first privilege level from which the upcall was invoked.

17. The computer system of claim 16, wherein the plurality of hierarchical privilege levels include a user privilege level, a supervisor privilege level, a hypervisor privilege level, and a secure privilege level, wherein the first privilege level is the supervisor privilege level and the second privilege level is the secure privilege level, wherein the software comprises a host operating system, and wherein the runtime service is part of secure firmware stored in non-volatile memory of the computer system.

18. The computer system of claim 16, wherein the plurality of hierarchical privilege levels include a user privilege level, a supervisor privilege level, and a hypervisor privilege level, wherein the first privilege level is the supervisor privilege level and the second privilege level is the hypervisor privilege level, wherein the software comprises a guest operating system, and wherein the runtime service is part of a hypervisor executing in the computer system, the hypervisor managing a virtual machine (VM) in which the guest operating system executes.

* * * * *